(12) United States Patent
Sundaresan

(10) Patent No.: US 9,323,832 B2
(45) Date of Patent: Apr. 26, 2016

(54) DETERMINING DESIRABILITY VALUE USING SALE FORMAT OF ITEM LISTING

(75) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 1574 days.

(21) Appl. No.: 12/347,258

(22) Filed: Dec. 31, 2008

(65) Prior Publication Data

US 2009/0319511 A1  Dec. 24, 2009

Related U.S. Application Data

(60) Provisional application No. 61/073,717, filed on Jun. 18, 2008.

(51) Int. Cl.
G06F 17/30 (2006.01)
G06Q 30/02 (2012.01)

(52) U.S. Cl.
CPC .......... *G06F 17/30657* (2013.01); *G06Q 30/02* (2013.01); *Y10S 707/99937* (2013.01)

(58) Field of Classification Search
CPC .............. G06F 17/30657; G06Q 30/02; Y10S 707/99937
USPC .................................................. 707/769, 748
See application file for complete search history.

(56) References Cited

U.S. PATENT DOCUMENTS

| 5,535,382 A | 7/1996 | Ogawa |
| 5,778,363 A | 7/1998 | Light |
| 5,873,001 A | 2/1999 | Brinker et al. |
| 5,963,910 A | 10/1999 | Ulwick |
| 6,202,068 B1 * | 3/2001 | Kraay ............... G06F 17/30554 |
| 6,205,456 B1 | 3/2001 | Nakao |
| 6,285,999 B1 * | 9/2001 | Page ................. G06F 17/30728 |
| 6,393,389 B1 | 5/2002 | Chanod et al. |

(Continued)

FOREIGN PATENT DOCUMENTS

GB  2366033  2/2002

OTHER PUBLICATIONS

Auction Insights, "Decoding eBay's Best Match", 14 pages, accessed online at <http://www.auctioninsights.info/decoding-ebays-best-match.html> on Dec. 9, 2015.*

(Continued)

*Primary Examiner* — Phuong Thao Cao
(74) *Attorney, Agent, or Firm* — Schwegman Lundberg & Woessner, P.A.

(57) ABSTRACT

Some example embodiments illustrate a system and method to sort a search result using sale format information. The system and method include providing a desirability index including multiple desirability values. Each desirability value may be associated with a keyword and indicate an accumulative frequency of the keyword being in an item listing selected throughout multiple user transactions. The system and method include identifying a search result including item listings in response to a query from a user device. The system and method include accessing, for each item listing, the desirability index and getting a desirability value for each keyword included in the item listing. The system and method include calculating a relevancy value using the desirability values for the keywords of a given item listing. The system and method further include sorting the item listings according their relevancy values and returning the sorted item listings to the user device.

31 Claims, 8 Drawing Sheets

(56) References Cited

U.S. PATENT DOCUMENTS

| | | | |
|---|---|---|---|
| 6,438,579 | B1 | 8/2002 | Hosken |
| 6,490,577 | B1* | 12/2002 | Anwar |
| 6,714,929 | B1 | 3/2004 | Micaelian et al. |
| 6,785,676 | B2 | 8/2004 | Oblinger |
| 6,901,399 | B1 | 5/2005 | Corston et al. |
| 7,340,428 | B1 | 3/2008 | White et al. |
| 7,814,112 | B2* | 10/2010 | Gupta .......... G06F 17/3053 707/748 |
| 8,200,683 | B2 | 6/2012 | Gupta et al. |
| 2002/0069190 | A1 | 6/2002 | Geiselhart |
| 2003/0014428 | A1 | 1/2003 | Mascarenhas |
| 2003/0014501 | A1 | 1/2003 | Golding et al. |
| 2003/0028527 | A1 | 2/2003 | Crosby et al. |
| 2003/0040850 | A1 | 2/2003 | Najmi et al. |
| 2003/0144868 | A1 | 7/2003 | MacIntyre et al. |
| 2003/0195877 | A1 | 10/2003 | Ford et al. |
| 2004/0068495 | A1 | 4/2004 | Inaba et al. |
| 2004/0083198 | A1* | 4/2004 | Bradford .......... G06F 3/0236 |
| 2004/0098385 | A1* | 5/2004 | Mayfield et al. .......... 707/3 |
| 2004/0181604 | A1 | 9/2004 | Immonen |
| 2005/0039136 | A1 | 2/2005 | Othmer |
| 2005/0097204 | A1 | 5/2005 | Horowitz et al. |
| 2005/0131724 | A1* | 6/2005 | Clay .......... 705/1 |
| 2005/0160107 | A1 | 7/2005 | Liang |
| 2005/0192992 | A1 | 9/2005 | Reed et al. |
| 2005/0198026 | A1* | 9/2005 | Dehlinger et al. .......... 707/5 |
| 2006/0031340 | A1 | 2/2006 | Mathew et al. |
| 2006/0074864 | A1 | 4/2006 | Naam et al. |
| 2006/0095346 | A1 | 5/2006 | Gambhir |
| 2006/0095431 | A1* | 5/2006 | Nash .......... 707/7 |
| 2006/0161534 | A1* | 7/2006 | Carson et al. .......... 707/3 |
| 2006/0242129 | A1 | 10/2006 | Libes et al. |
| 2006/0288000 | A1* | 12/2006 | Gupta .......... 707/5 |
| 2007/0208656 | A1* | 9/2007 | Feaver .......... G06Q 30/06 705/37 |
| 2007/0288433 | A1* | 12/2007 | Gupta .......... G06F 17/30663 |
| 2008/0256040 | A1* | 10/2008 | Sundaresan .......... G06Q 30/02 |
| 2008/0306938 | A1 | 12/2008 | Johnson et al. |
| 2009/0299978 | A1* | 12/2009 | Farfurnik .......... G06F 17/30887 |
| 2009/0319511 | A1* | 12/2009 | Sundaresan .......... G06Q 30/02 |
| 2010/0017398 | A1 | 1/2010 | Gupta et al. |
| 2013/0246407 | A1 | 9/2013 | Gupta et al. |
| 2015/0227559 | A1* | 8/2015 | Hatami-Hanza .. G06F 17/30292 707/748 |

OTHER PUBLICATIONS

"U.S. Appl. No. 12/495,663, Response filed Jun. 28, 2011 to Final Office Action mailed Mar. 28, 2011", 14 pgs.
"U.S. Appl. No. 11/679,973 , Final Office Action mailed Aug. 21 2009", 13 Pgs.
"U.S. Appl. No. 11/679,973, Advisory Action mailed Nov. 23, 2009", 3 pgs.
"U.S. Appl. No. 11/679,973, Non Final Office Action mailed Mar. 18, 2009", 3 pgs.
"U.S. Appl. No. 11/679,973, Pre-Appeal Brief Request filed Dec. 21, 2009", 5 pgs.
"U.S. Appl. No. 11/679,973, Response filed Nov. 5, 2009 to Final Office Action mailed Aug. 21, 2009", 13 pgs.
"Application U.S. Appl. No. 11/679,973. Response filed Jun. 12, 2009 to Non Final Office Action mailed Mar. 18, 2009", 12 pgs.
"International Application Serial No. PCT/US2008/08024, Search Report and Written Opinion mailed on Oct. 1, 2008", p. 220, 10 pgs.
Bukkoten, O., et al., "Efficient web browsing on handheld devices using page and form summarization", *ACM Transactions on Information Systems*, 20(1), (2002), 82-115.
Chan, Susy, et al., "Useability for mobile commerce across multiple form factors", *Journal of Electronic Commerce Research*, 3(3), (2002), 187-199.
Hassel, Martin, et al., "SweSum—Automatic Text Summarizer", http://swesum.nada.kth.se/index-eng.html, (2005).
Yang, Christopher. et al., "Fractal Summarization for Mobile Devices to Access Large Documents on the Web", *Proceedings International WWW Conference*, Budapest, Hungary., (2003).
"U.S. Appl. No. 11/679,973, Appeal Brief filed May 13, 2010", 24 pgs.
"U.S. Appl. No. 11/679,973, Decision on Pre-Appeal Brief Request mailed Apr. 13, 2010", 2 pgs.
"U.S. Appl. No. 11/679,973, Notice of Allowance mailed Jun. 9, 2010", 17 pgs.
"U.S. Appl. No. 12/495,663, Final Office Action mailed Mar. 28, 2011", 11 pgs.
"U.S. Appl. No. 12/495,663, Non Final Office Action mailed Nov. 17, 2010", 17 pgs.
"U.S. Appl. No. 12/495,663, Response filed Feb. 17, 2011 to Non Final Office Action mailed Nov. 17, 2010", 13 pgs.
"U.S. Appl. No. 12/495,663, Notice of Allowance mailed Feb. 15, 2012", 14 pgs.
"U.S. Appl. No. 13/491,183, Non Final Office Action mailed Nov. 15, 2012", 13 pgs.
"U.S. Appl. No. 13/491,183, Response filed Feb. 15, 2013 to Non Final Office Action mailed Nov. 15, 2012", 10 pgs.
"U.S. Appl. No. 13/491,183, Advisory Action mailed May 27 2014", 3 pgs.
"U.S. Appl. No. 13/491,183, Final Office Action mailed Mar. 6, 2014", 19 pgs.
"U.S. Appl. No. 13/491,183, Final Office Action mailed Apr. 10, 2013", 15 pgs.
"U.S. Appl. No. 13/491,183, Non Final Office Action mailed Aug. 7, 2013", 14 pgs.
"U.S. Appl. No. 13/491,183, Pre-Appeal Brief Request filed Jun. 6, 2014", 4 pgs.
"U.S. Appl. No. 13/491,183, Response filed Jan. 7, 2014 to Non Final Office Action mailed Sep. 7, 2013", 7 pgs.
"U.S. Appl. No. 13/491,183, Response filed May 6, 2014 to Final Office Action mailed Mar. 6, 2014", 8 pgs.
"U.S. Appl. No. 13/491,183, Response filed Jul. 10, 2013 to Final Office Action mailed Apr. 10, 2013", 10 pgs.
"U.S. Appl. No. 13/875,074, Final Office Action mailed Nov. 27, 2013", 21 pgs.
"U.S. Appl. No. 13/875,074, Non Final Office Action mailed Jun. 27, 2013", 17 pgs.
"U.S. Appl. No. 13/875,074, Preliminary Amendment filed May 7, 2013", 5 pgs.
"U.S. Appl. No. 13/875,074, Response filed Feb. 27, 2014 to Final Office Action mailed Nov. 27, 2013", 10 pgs.
"U.S. Appl. No. 13/875,074, Response filed Oct. 28, 2013 to Non Final Office Action mailed Jun. 27, 2013", 16 pgs.

\* cited by examiner

| ITEM LISTING ID NO. 610 | VIEW TAG (e.g., clicked or unclicked) 620 | KEYWORDS IN TITLE 630 | | SALE FORMAT 640 | LISTING PERIOD 650 | NUMBER OF BIDS 660 |
|---|---|---|---|---|---|---|
| | | QUERY KEYWORDS 632 | NON-QUERY KEYWORDS 634 | | | |
| 1 | CLICKED | PERSIAN | CARPET | FIXED | | |
| 2 | CLICKED | PERSIAN | VASE | AUCTION | 3 MIN | 55 |
| 3 | CLICKED | PERSIAN | VASE | AUCTION | 7 DAYS | 2 |
| ... | ... | ... | TABRIZ ... BLUE ... | ... | ... | ... |

FIG. 6

| ID 710 | KEYWORD 720 | DESIRABILITY VALUE 730 | DEMAND VALUE 740 | SUPPLY VALUE 750 | RESERVED AREA 760 |
|---|---|---|---|---|---|
| 1 | CARPET | +20 | | | |
| 2 | VASE | -15 | | | |

*FIG. 7*

DETERMINING DESIRABILITY VALUE USING SALE FORMAT OF ITEM LISTING

CROSS REFERENCE TO RELATED APPLICATIONS

The present application claims the priority benefit of U.S. Provisional Patent Application Ser. No. 61/073,717 filed Jun. 18, 2008 and entitled "DESIRABILITY VALUE USING SALE FORMAT RELATED FACTORS," of which application is incorporated herein by reference in its entirety. The present application is related to U.S. Non-Provisional patent application Ser. No. 11/679,973 entitled "DETERMINING RELEVANCY AND DESIRABILITY OF TERMS" filed Feb. 28, 2007, and published Dec. 13, 2007. The content of the publication is incorporated by reference in its entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright ©2008, eBay Inc. All Rights Reserved.

TECHNICAL FIELD

Example embodiments relate generally to the technical field of algorithms and programming and, in one example, the sorting of data.

BACKGROUND

Computers are now used to store massive amounts of information. In order to locate particular information of interest, powerful and intuitive search mechanisms have been created. For example, the World Wide Web portion of the Internet has grown exponentially since the late 1980's when the World Wide Web was first introduced. Early in the history of the World Wide Web, directories of web sites were used to guide users to web sites of interest. One of the most famous early web site directories was "Jerry's Guide to the World Wide Web" which was later renamed "Yahoo!". However, the rapid real-time growth of the Internet quickly made World Wide Web directories unmanageable and prone to being out of date. Internet search engines such as Lycos, Alta Vista, and Google became the new method finding web sites on the Internet. Internet search engines allow a user to enter a few keywords related to the topic of interest and return with a large set of search results that contain the keywords entered by the user.

Internet search engines operate by "crawling" the World Wide Web to learn about new web pages and then create a searchable index of all the web pages that were visited. When a user enters a set of keywords, the search engine returns a set of web pages that contain the keywords entered by the user. However, most queries entered by search engine users will map to thousands or even hundreds of thousands of results that contain the matching keywords. This information overload is not desired by the user. Thus, the real key to building a very good search engine and thereby a good online listing system (e.g., eBay) is to sort the results by some type of relevancy measure. In this manner, the user of an internet search engine may quickly find desired content.

BRIEF DESCRIPTION OF THE DRAWINGS

Some embodiments are illustrated by way of example and not limitation in the FIGS. of the accompanying drawings in which:

FIG. 6 is a diagram illustrating a data structure for an item listing table in accordance with an example embodiment.

FIG. 7 is a diagram illustrating a data structure for a desirability index in accordance with an example embodiment.

DETAILED DESCRIPTION

Figure 1:
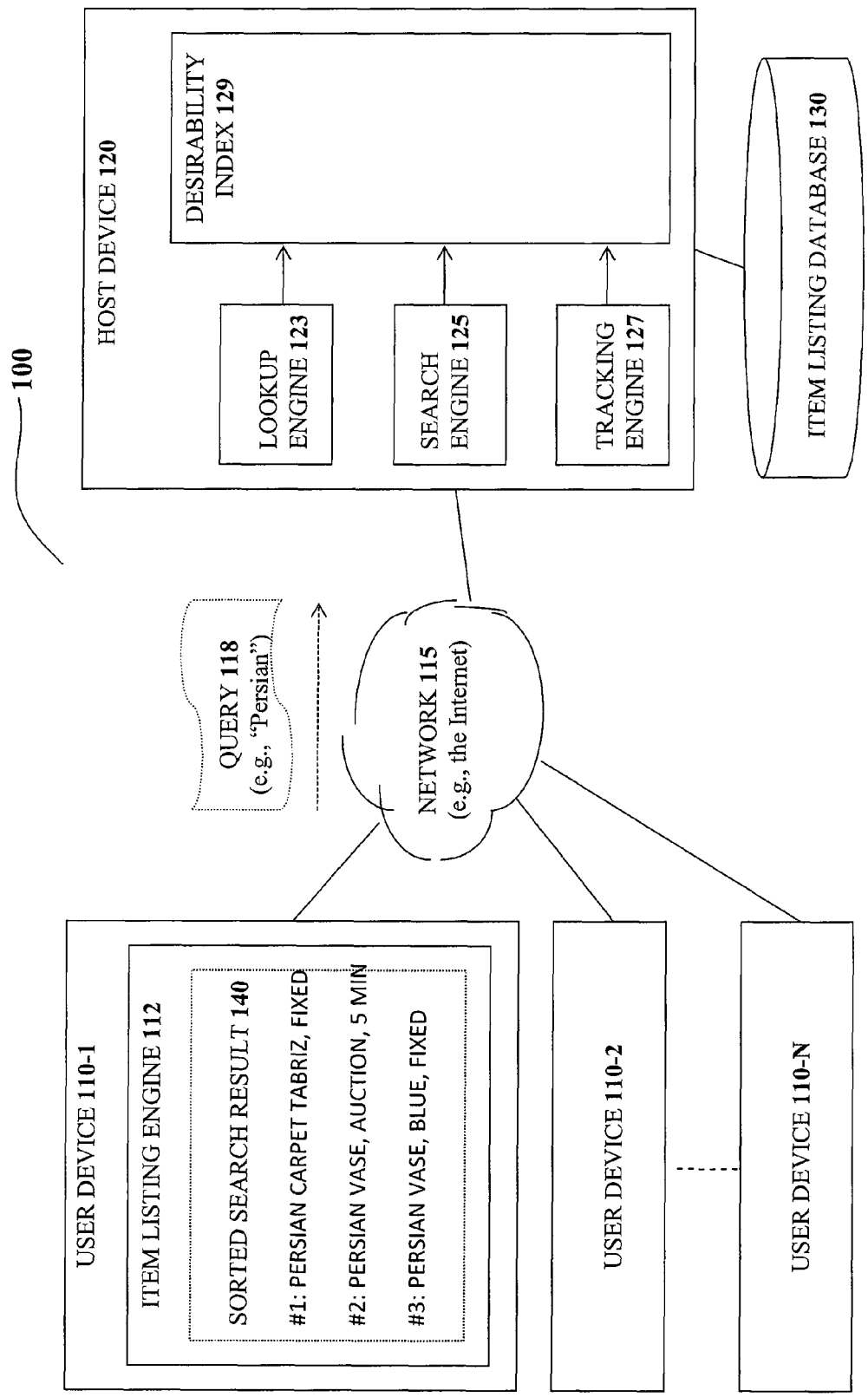
FIG. 1 is a block diagram of a system for building and using a desirability index in accordance with an example embodiment.

An online listing system in which goods/services are offered to interested parties (e.g., eBay) may accept a keyword query from a user and respond to the user with a number of matching item listings. The user may then review the returned item listings to select an item listing that best satisfies his requirements. To simplify the user's task of finding a desired item, an online listing system should ideally prioritize (e.g., sort) the item listings before returning the item listings to the user.

Numerous techniques exist for helping an online listing system sort identified item listings that satisfy a user query. For example, a relevancy value for a descriptive factor (e.g., a word or a phrase) associated with an item listing is increased when a user selects that item listing. In using the relevancy value, a user's selection of the user's own items may not be allowed to affect the relevancy system to prevent abuse of the relevancy determination system. In one embodiment, only a first selection of a particular item by a user will affect the relevancy value and any additional selections of that item will have no effect. In another embodiment, the size of changes made due to the selections by a particular user to the relevancy value may be correlated to that user's reputation score.

The existing techniques prior to our invention, however, did not consider sale format related factors to determine the desirability values for corresponding keywords. A sale format is information that may indicate the way an item posted for sale is transacted in an online listing system. For example, the sale format may be an auction sale, a fixed price sale or a combination of the both (e.g., an auction sale with a minimum bidding price or buy now price). A pure auction sale or an auction sale with a minimum bidding price may be associated with a number of biddings that have been place on a corresponding item listing posted for sale. In some situations, the same bidder may place multiple biddings on the same item listing for sale. In such a case, the number of total biddings is larger than the number of bidders who have really placed a bid and does not correctly represent popularity of the item listing among the bidders. Therefore, the number of bidders may be kept for each item listing posted as an auction sale or as an auction sale with a minimum bidding price. An item listing may include a listing period that defines how long the item listing will be active (e.g., posted). The listing period may be assigned to its corresponding item listing regardless of the sale format of that item listing.

Since such sale format related factors are not factored in, a relevancy value for a given term or phrase under the existing search techniques do not correctly reflect the fact that users of an online listing system select (e.g., click through) certain type of items listings not only because of the relevant words or phrases included therein but also because of the sale format related factors but not because of the words or phrases included in the item listings. For example, eBay's experience shows that its users select (e.g., clicks through) item listing for antiques because they are listed as auction sale items not because they contain certain words or phrases. The experience also shows that the users select an item listing more willingly when the remaining listing period for the item listing is short (i.e., ending soon) than when the remaining period for the item listing is long (i.e., ending late). It is further found that the larger number of biddings is made on an item listing, the more likely the users are to select that item. The existing relevancy-based search techniques, therefore, are prone to be skewed on such particular items as antiques and thus to miss users' activities (e.g., selection by click through) thereon. A new method and system is needed to resolve this problem and other problems that may be inherently or explicitly disclosed by a further reading of this documentation.

In some example embodiments, a system and method are illustrated to build a desirability index using sale format related information. The system and method include providing a user device with a first search result including one or more item listings in response to a first query received from the user device. Each item listing may include a plurality of keywords and be associated with a sale format. The system and method include tracking a plurality of transactions performed on the item listings via the user device. The system and method include assigning, for each transaction, a first numerical value to the keywords included in a selected item listing and a second numerical value to the keywords included in non-selected item listings. The first numerical value may be determined based upon the sale format associated with the selected item listing. The system and method further include building a desirability index using the numerical values assigned to the keywords. The desirability index may include a desirability value for each of the keywords. Each desirability value may indicate an accumulative frequency of a corresponding keyword being selected throughout the transactions. The desirability index may be accessed later to sort item listings in a second search result identified in response to a second query.

In some example embodiments, the system and method may accumulate the desirability values for corresponding keywords in a respective item listing in the second search result to calculate a relevancy value for the respective item listing. The system and method may further sort the item listings in the second search result based upon their relevancy values and return the sorted second search result to the user device. More detailed explanation about the building of the desirability index using sale format related information, and the sorting of the search result is given below using FIGS. 1-8.

FIG. 1 is a block diagram of a system for building and using a desirability index 100 according to an example embodiment. FIG. 1 illustrates more than one user devices (110-1, 110-2 and 110-N), a network (e.g., the Internet) 115, and a host device 120. Each user device (e.g., 110-1) may be a personal computer (PC), a cell phone, a personal digital assistant (PDA), or any other appropriate computer device. Each user device (110-1, 110-2 or 110-N) includes an item listing request engine 112. In one embodiment, the item listing request engine comprises a web browser program. Although a detail description is only illustrated for user device 110-1, it is noted that each of the other user devices (e.g., user device 110-2 through user device 110-N) may have corresponding elements with the same functionality.

The item listing request engine 112 may receive a query 118 for item listings from a user via an input device such as keyboard, mouse, electronic pen, etc. (not shown in FIG. 1). A more detailed explanation about the functionality of the item listing request engine 112 is given later in this document with reference to FIGS. 2-5.

A host device 120 of an online listing system stores many item listings. Each item listing is a detailed description for an item as uploaded to the host device 120. The item associated with an item listing may be a good (e.g., iPod Nano) or service (e.g., golf round) that may be transacted (e.g., exchanging, sharing information about, buying, selling, making a bid on, etc.). The item listing may include a title, a category (e.g., electronics, sporting goods, books, antiques, etc.), a sale format (e.g., auction sale or fixed price sale) and other tag information (e.g., color, size, period of use if the item is a used item, etc.). The item listing may further include a listing period that defines how long that item listing will be active (e.g., posted). A more detailed explanation about a data structure for the item listings is given later in this document with reference to FIG. 6.

Referring back to the user device 110-1, the query received from the user of user device 110-1 may comprise one or more keywords. The item listing request engine 112 may then transmit the query 118 to the host device 120 via the network 115. The host device 120 will attempt to match the query keywords with the title, the category, the tag information, or any other field in the item listing. The network 115 may be the Internet, Local Area Network (LAN), Wide Area Network (WAN) or any of other suitable networks.

The host device 120 may run a lookup engine 123, a search engine 125, a tracking engine 127 and a desirability index 129. In response to the search query 118, the search engine 125 will attempt to identify one or more item listings that satisfy the query 118. In some example embodiments, the lookup engine 123 may look up the desirability index 129 that includes desirability values for each keyword or phrase and determine a desirability value for each term in a title of a respective identified item listing in the search result. A desirability value for a given keyword or a phrase indicate how often an item listing including the given keyword or the phrase has been demanded (e.g., selected) by one or more users. The demand (e.g., selection) may be determined by tracking the activities performed by the users on the item listings, such as viewing, making a bid on, or purchasing the corresponding item. The activities may be performed by clicking on or placing a mouse over the corresponding item listing. In some example embodiments, the tracking engine 127 may build the desirability index 129 through a number of user activities before the lookup engine 123 can refer to the desirability index 129. A more detailed explanation about building the desirability index 129 is provided below with reference to FIG. 2.

Using the desirability values for the terms in the title, the lookup engine 123 may then generate a relevancy value for the respective item listing. A more detailed explanation about sorting the item listings in the search result using the relevancy value is given below with reference to FIG. 3. The search engine 125 may then sort the item listings in the search result according to the relevancy values for the item listings. The host device 120 may then return a sorted search result 140 via the item listing request engine 112 to the user device 110-1 that sent the query 118. In some example embodiments, the desirability value may not be considered for terms included in the query in generating the relevancy value for the respective item listing in the search result. In some example embodiments, the item listings and/or the desirability index 129 may reside in an item listing database 130 which may be operatively coupled to the host device 120 locally, or remotely via the network 115 or a distinct network (not shown in FIG. 1).

Figure 2:
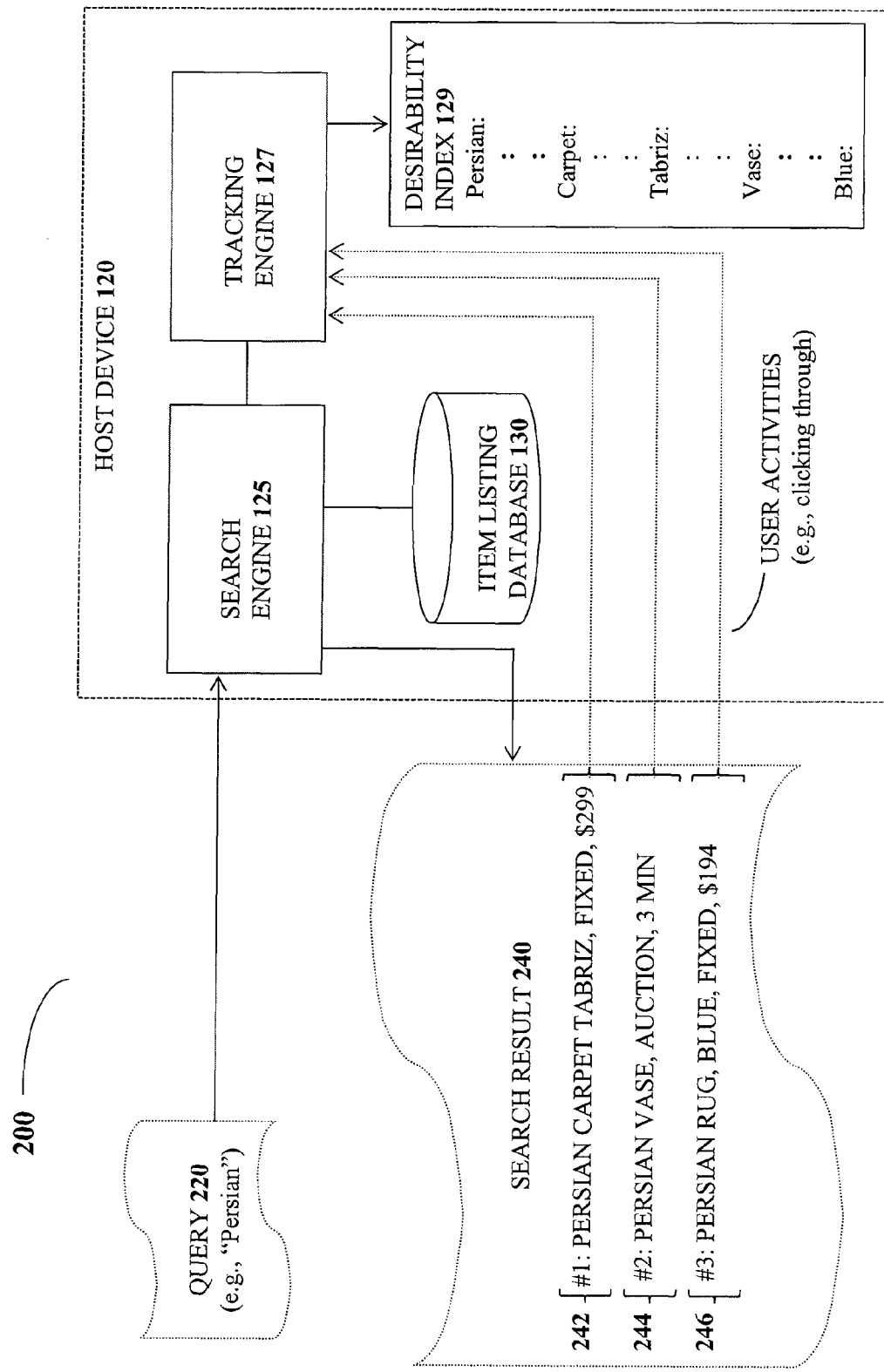
FIG. 2 is a block diagram of a computer system for building a desirability index in accordance with an example embodiment.

FIG. 2 is a block diagram of a computer system used to build a desirability index 200 according to an example embodiment. FIG. 2 illustrates a more detailed view of the host device 120 of FIG. 1. As described with reference to FIG. 1, the host device 120 may comprise the search engine 125, the tracking engine 127, the desirability index 129 and the item listing database 130. The search engine 125 may receive a query ("Persian") 220 from the user via the item listing request engine 112 of the device (e.g., 110-1). In response to the query 220, the search engine 125 may search the item listing database 130 and identify one or more item listings that satisfy the query 118. The item listing database 130 may be locally or remotely connected to the search engine 125.

When the item listings satisfying the query 220 are identified, the search engine 125 may return a search result 240 including three identified item listings 242, 244 and 246 to the user device (e.g., 110-1) via the item listing request engine 112. The user who sent the query 220 may then perform activities (e.g., viewing, making bids on, or purchasing the item listing, etc.) on the identified item listings (e.g., 242, 244 and 246). The activities may be viewing, sending a question about, placing a bid on, or purchasing one or more of the item listings in the search result 240. The activities may be done by, for example, clicking on a corresponding item listing.

The tracking engine 127 may track these user activities on the item listings (e.g., 242, 244 and 246). In tracking the user activities, the tracking engine 127 may assign a positive numerical value to the terms included in a selected item listing and zero or a negative numerical value to the terms included in the rest of the item listings (e.g., item listings not selected by the user). The numerical value may be any arbitrary number. In some example embodiments, an integer value, such as one or two, etc., may be used. In some example embodiments, a decimal fraction may be used in lieu of the integer value.

In assigning the numerical value for users' activities on particular items such as antiques, the tracking engine 127 may consider a sale format for the item listings. For example, if the sale format of the selected item listing is set to be an auction, the tracking engine 127 may assign the positive numerical value to the terms included in the title of the selected item listing. If the sale format of the selected item listing is set to be a fixed price, however, the tracking engine 127 may not assign any positive numerical value to the terms included in the title of the selected item listing. This is because it is proved by experience that users tend to select an item listing for a particular category (e.g., antiques) more willingly when the item listing is listed as an auction sale than when the item listing is listed as a fixed price sale. In some example embodiments, the sale format for the selected item listing may be a combination of the auction and the fixed price. For example, the item listing may be listed as an auction item with a predefined fixed price (e.g., "Buy Now" amount) to buy the item immediately. If a user places the fixed price as a bid for the item, the auction for the item listing may be stopped even if a listing period (or auction period) for the item listing has not expired. For the terms included in the combined format item listing, the tracking engine 127 may assign a fraction (e.g., a half or a quarter, etc.) of the positive numerical value that is assigned to the terms included in an auction format item listing. In some example embodiments, the tracking engine 127 may not assign the positive numerical value to the terms in the query 220 (e.g., "Persian") even if they are included in the item listing selected by the user. In some example embodiments, the tracking engine 127 may further normalize the accumulated score for a respective term.

An illustrative example for assigning a numerical value is given below with reference to FIG. 2. If the query (e.g., "Persian") 220 is received from the user device (e.g., 110-1), the search engine 125 may return the search result 240 including the following three item listings 242, 244 and 246 to the user device:

1. "Persian carpet Tabriz", Fixed, $299;
2. "Persian vase", Auction, 3 minutes;
3. "Persian rug blue", Fixed, $190.

If the user clicks on the item listing #1 (242), the tracking engine 127 may not assign any positive numerical value to the terms "carpet" and "Tabriz" because the related sale format is a fixed price. In the meantime, the tracking engine 127 may assign negative numerical value (e.g., −5) to the terms "vase," "rug" and "blue" because these terms are included in the titles of the item listings that were not clicked on. If the user clicks on the item listing #2 (244), the tracking engine 127 may assign a positive numerical value (e.g., +10) to the term "vase" because the item listing #2 (244)'s sale format is an auction. The terms "carpet," "Tabriz," "rug" and "blue" may get a negative value because these are terms in the item listings that were not clicked on. If the item listing #3 (246) is clicked on, the tracking engine 127 may not assign any positive value to the terms "rug" or "blue" because the item listing #3's (246) sale format is a fixed price. The terms "carpet," "Tabriz" and "vase" may be assigned a negative value because these terms are included in the titles of the item listings that were not clicked on. The scores assigned to each term may then be accumulated in the desirability index 129 which may be operatively coupled to the host device 120 locally or remotely. For example, if the desirability values for "carpet", "vase" and "rug" become, for example, 20, 30 and 10, respectively, after tracking a series of the user's activities on the item listings 242, 244 and 246, the tracking engine 127 may normalize the desirability values into, for example, 2, 3 and 1, respectively.

The tracking engine 127 may consider other sale format related factors to assign a numerical value to keywords in a selected item listing. In some example embodiments, an item listing may be associated with a listing period. The listing period may be indicated by, for example, an ending time. In such a case, the tracking engine 127 may further consider the listing period to assign a numerical value to terms of the item listing. For example, if the item listing is clicked on, the listing period associated with the item listing may be checked first. The listing period may be associated with one of a plurality of non-continuous ending times (e.g., a set of seven days, six days, five days, four days, three days, two days, one day, five hours, five minutes, etc.). Any other ending time (e.g., nine or twenty days) may be employed to indicate the listing period as long as the system resources allow. The tracking engine 127 may assign a positive value to the terms in the title of the selected item listing if its ending period is equal to or shorter than a predefined period (e.g., 5 minutes or 5 hours). In contrast, the tracking engine 127 may assign zero or a negative value to the terms in the selected item listing if its ending period is longer than the predefined period.

The tracking engine 127 may consider the sale format and the listing period at the same time to assign a numerical value to the terms in a selected item listing. In some example embodiments, the tracking engine 127 may assign a positive value (e.g., +1) to terms in the selected item listing only when the sale format is an auction and its listing period is equal to or less than the predetermined value (e.g., 5 minutes). In some example embodiments, the tracking engine 127 may assign a higher numerical value (e.g., +3) to the terms in the selected item listing if its sale format is an auction and the listing period is equal to or less than the predetermined value (e.g., 5 minutes). The tracking engine 127, however, may assign a medium numerical value (e.g., +2) to the terms in the selected item listing if its sale format is an auction but the listing period is longer than the predetermined value. The tracking engine 127 may assign a lower numerical value (e.g., +1 or 0) or negative numerical value to the terms in the selected item listing if its sale format is a fixed price sale.

In some example embodiments, the tracking engine 127 may further consider a number of bids on an item listing to assign a numerical value to the terms in the item listing selected by the user. For example, two or more item listings returned to the user in response to his query may be auction items (e.g., their sale formats being associated with an auction) and/or ending soon (e.g., 10 minutes). If the first item listing has only two bids and the second item listing has 55 bids and so on, it may be the number of bids that causes the user to click on the second item listing. In such a case, the tracking engine 127 may determine whether to assign a numerical value to terms in the item listing based upon the number of bids for the item listing. The tracking engine 127 may assign a positive numerical value to the terms in the selected item listing if the number of bids on the selected item listing is equal to or more than a predefined number of bids (e.g., 100). In contrast, the tracking engine 127 may assign zero or a negative numerical value to the terms in the selected item listing if the number of bids on the selected item listing is less than the predefined number of bids (e.g., 100).

It is noted that each of the engines described above in FIG. 2 may be implemented by hardware (e.g., circuit), firmware, software or any combinations thereof. It is also noted that although each of the engines is described above as a separate module, the entire engines or some of the engines in FIG. 2 may be implemented as a single entity (e.g., module or circuit) and still maintain the same functionality. Although FIG. 2 describes assigning a numerical value to each term, a plurality of terms may be coupled together and assigned the numerical value as a group using a similar method. In such a case, the desirability index 129 may contain the coupled terms as a separate item. The tracking engine 127 may then similarly apply some or entire processes described above for each of the coupled terms.

Figure 3:
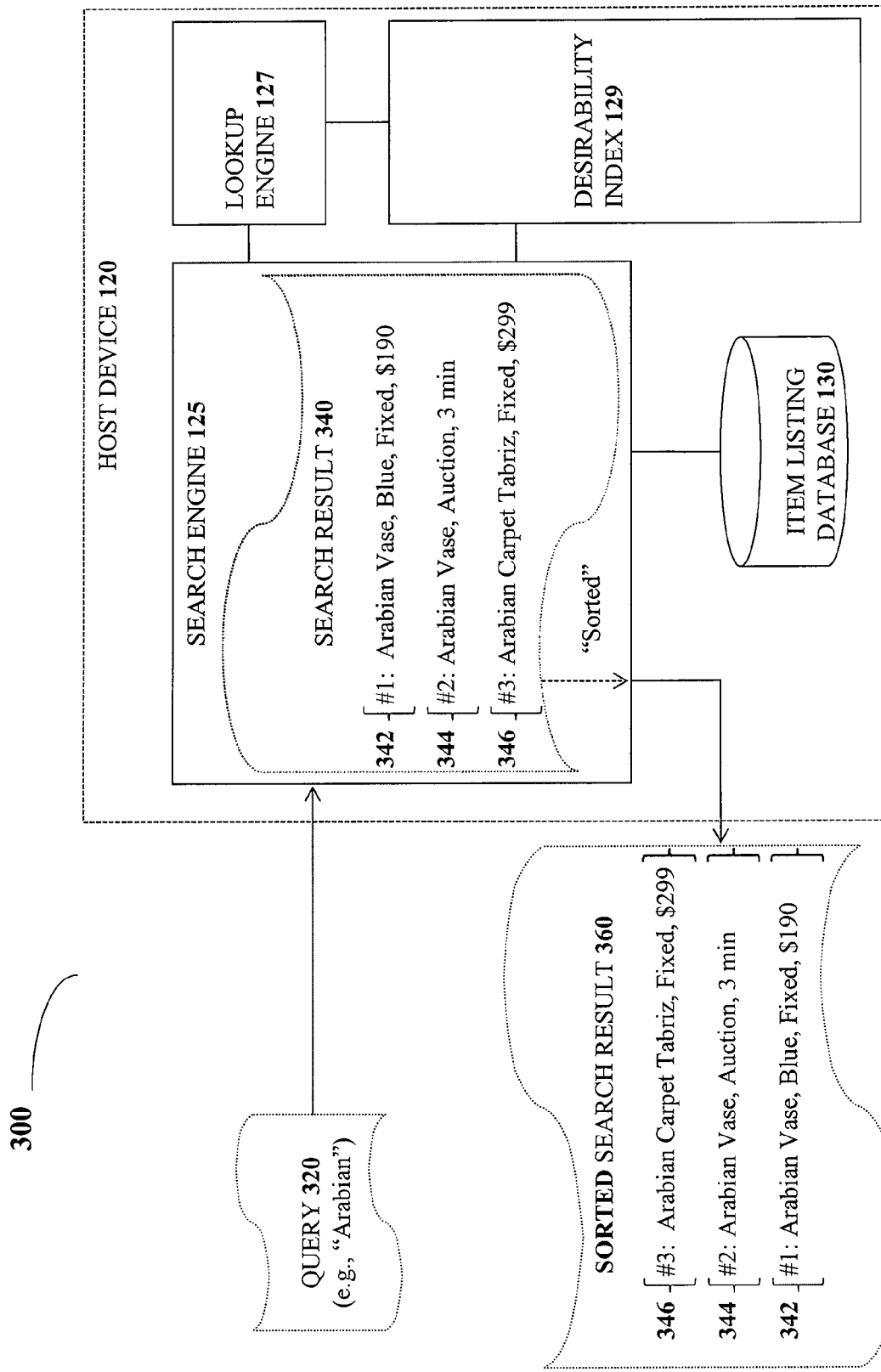
FIG. 3 is a block diagram of a computer system for sorting item listings in a search result using a desirability index in accordance with an example embodiment.

FIG. 3 is a block diagram of a computer system for sorting item listings in a search result using a desirability index 300 according to an example embodiment. Illustrated in FIG. 3 is the host device 120. As described above in FIG. 1, the host device 120 may include the search engine 125 and the lookup engine 123. In some example embodiments, the host device 120 may be coupled to the item listing database 130 locally or remotely, via the network 115 or other suitable networks as described above in FIG. 1. In such a case, the item listing database 130 may be operatively coupled to the search engine 125.

The search engine 125 may receive the query (e.g., "Arabian") 320 from the user device (e.g., 110-1) via the item listing request engine 112. In response to the query 320, the search engine 125 may search the item listing database 130 and return a search result 340 identifying one or more item listings 342, 344 and 346 that satisfy the query 118. This search may be performed using a Structure Query Language (SQL) based query. If the desirability index 129 is built through tracking initial user activities as described in FIG. 2 above, the lookup engine 123 may then refer to the desirability index 129 to generate a relevancy value for a respective item listing in the search result. In some example embodiments, the desirability index 129 may be located in the item listing database 130. For the respective item listing, the lookup engine 123 may extract terms in the title of the item listing and look up the desirability index 129 to get a desirability value for each of the extracted terms. The search engine 125 may apply a mathematical function (e.g., addition) to all the desirability values for corresponding extracted terms to calculate the relevancy value for the respective item listing. If the relevancy value is calculated for each item listing in the search result, the search engine 125 may sort the item listings 342, 344 and 346 in the search result 340 according to the relevancy values and return a sorted search result 360 to the user via the item listing request engine.

In some example embodiments, instead of applying the mathematical function (e.g., addition) to all of the desirability values for corresponding terms in a given item listing, the lookup engine 123 may use a single term's desirability value to calculate the relevancy value for the given item listing. For example, the lookup engine 123 may check the desirability values for entire terms included in the given item listing, determine the highest desirability value and set the highest desirability value as the relevancy value for the given item listing. In some example embodiments, the desirability values for terms that are included in the query 320 may not be used to calculate the relevancy value.

An illustrative example for sorting item listings in a search result is given below using FIG. 3. In response to the query ("Arabian") 320, the search engine 125 may identify the search result 340 that includes following three item listings:

1. "Arabian Vase blue", fixed price, $190 (342);
2. "Arabian Vase", Auction ending in 3 minutes, current bid of $192 (344);
3. "Arabian Carpet Tabriz", fixed price, $299 (346).

If the desirability values for the terms "Arabian" "Vase", "blue", "carpet" and "Tabriz" are +3 +10, −15, +55 and +5, respectively, the lookup engine 123 may calculate the relevancy value for item listing #1 (342) to be −5 (e.g., adding 10 and −15). Likewise, the lookup engine 123 may calculate the relevancy values for item listings #2 (344) and #3 (346) to be +10 (e.g., adding +15 only) and +60 (e.g., adding +55 and +5), respectively. The search engine 125 may then sort the three item listings 342, 344 and 346 according to their corresponding relevancy values. As a result, the item listing #3 ("Arabian carpet Tabriz") 346 may move on the top in the sorted search result 360 since it has the highest relevancy value. The item listing #2 ("Persian Vase") 344 may take the second in order. The item listing #1 ("Persian Vase blue") 342 may move to the bottom in the sorted search result 360 because it has the lowest relevancy value. In some example embodiments, the lookup engine 123 may add the desirability value for "Arabian" (i.e., the term included in the query 320) as well to calculate the relevancy values for corresponding item listings.

If the lookup engine 123 is configured to set the highest desirability value to be the relevancy value for an associated item listing, the relevancy values for the three item listings 342, 344 and 346 may be +10 (e.g., the desirability value for Vase), +10 (e.g., the desirability value for Vase) and +55 (e.g., the desirability value for Carpet), respectively. If two or more item listings are assigned with the same relevancy values, the search engine 125 may give a higher rank in order to the item listing whose sale format is an auction. If the sale format is also the same, the search engine 125 may then give a higher rank in order to the item listing whose remaining listing period (e.g., ending time) is shorter.

It is noted that each of the engines described above in FIG. 3 may be implemented by hardware (e.g., circuit), firmware, software or any combinations thereof. It is also noted that although each of the engines is described above as a separate module, the entire engines or some of the engines in FIG. 3 may be implemented as a single entity (e.g., module or circuit) and still maintain the same functionality. Although FIG. 3 describes obtaining a desirability value for each term, a plurality of terms may be coupled together as a group and thereby associated with a single desirability value. In such a case, the desirability index 129 may contain the coupled terms as a separate item. The lookup engine 123 may then similarly apply some or entire processes described above for the coupled terms.

Figure 4:
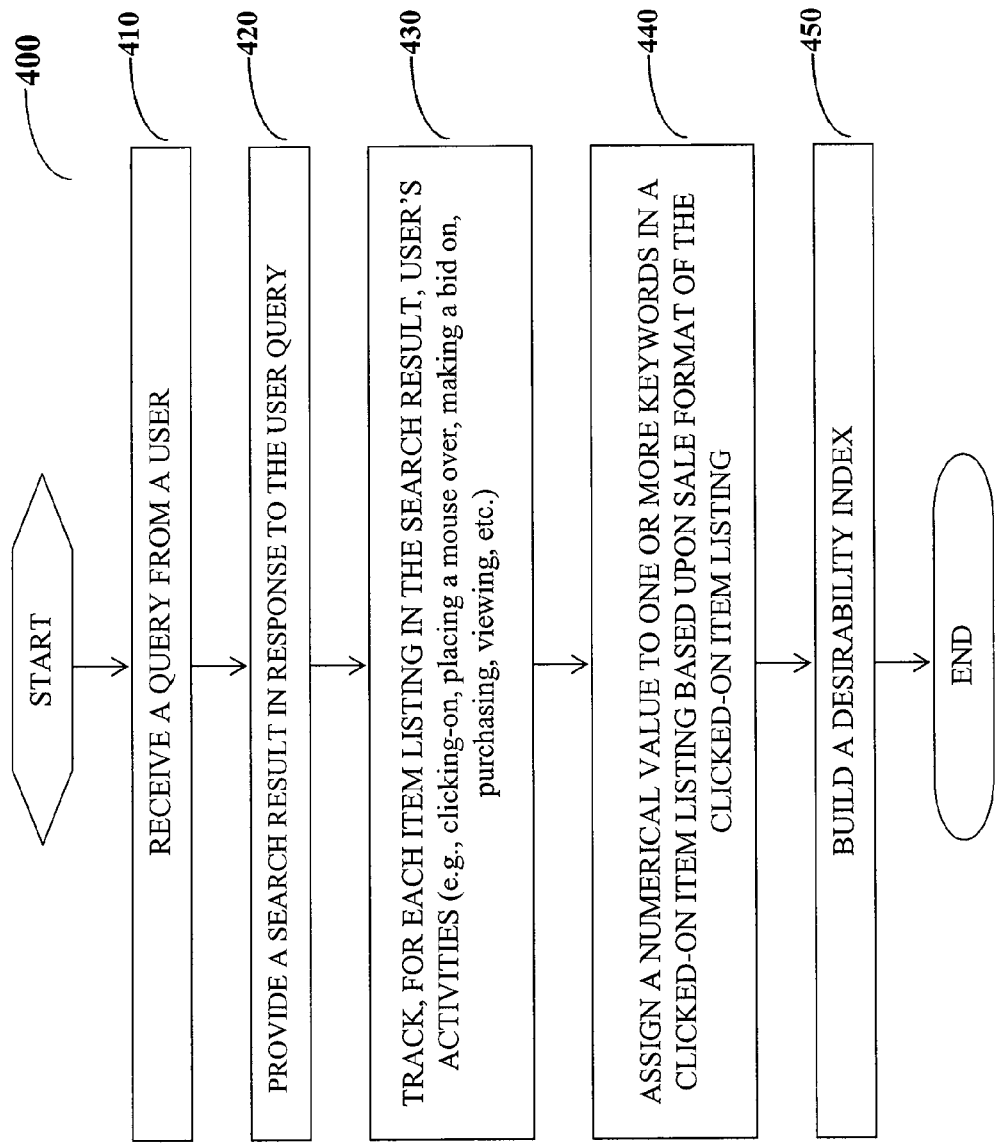
FIG. 4 is a flow chart illustrating a method used to build a desirability index in accordance with an example embodiment.

FIG. 4 is a flow chart illustrating a method used to build a desirability index 400 according to an example embodiment. In some example embodiments, the method 400 may be implemented by the host device 120. At operation 410, the query (e.g., 220) may be received from a user via a user device (e.g., 110-1). The query may comprise one or more keywords. At operation 420, a search result (e.g., 240) may be returned to the user via the user device (e.g., 110-1) in response to the query (e.g., 220). The search result may have one or more item listings that satisfy the query received from the user.

At operation 430, the user's activity (e.g., clicking on, purchasing, placing a bid on, or adding in a watch list, etc.) may be tracked for a respective item listing in the search result. If a user activity is selected, at operation 440, one or more sale format related factors of the respective item listing may be checked. For example, if it is determined that the sale format of the selected item listing is an auction, a positive numerical value may be assigned to each of the terms in the title of the respective item listing. On the contrary, if it is determined that the sale format of the selected item listing is a fixed price, the terms in the title of the selected item listing may not be assigned any positive numerical value. A negative numerical value may be assigned to the terms in item listings that are not selected (e.g., clicked on, etc.). As discussed above in FIG. 2, the numerical value may be any arbitrary number. In some example embodiments, an integer value, such as one or two, etc., may be used. In some example embodiments, a statistical value may be used in lieu of the integer value. Other sale format related factors, such as a listing period (e.g., an ending time) or a number of bids, may be considered to assign the numerical value as explained above in FIG. 2.

At operation 450, a desirability index may be built to reflect the newly assigned numerical values to terms in the item listings in the search result. In some example embodiments, the positive and negative values may be only assigned to terms in the item listing's title that do not occur in the query. In some example embodiments, the desirability index for a number of terms may be built throughout certain numbers (e.g., 10, 50, 100 or 500, etc.) of user activities on query results (e.g., clicks-on, bids, purchases, or adds to watch list, etc.) over a period of time (e.g., week, month or year, etc.). In some example embodiments, the desirability index may be built in nearly or substantially real time (e.g., one minute, ten minute or an hour, etc.) and used to sort item listings in a search result.

Figure 5:
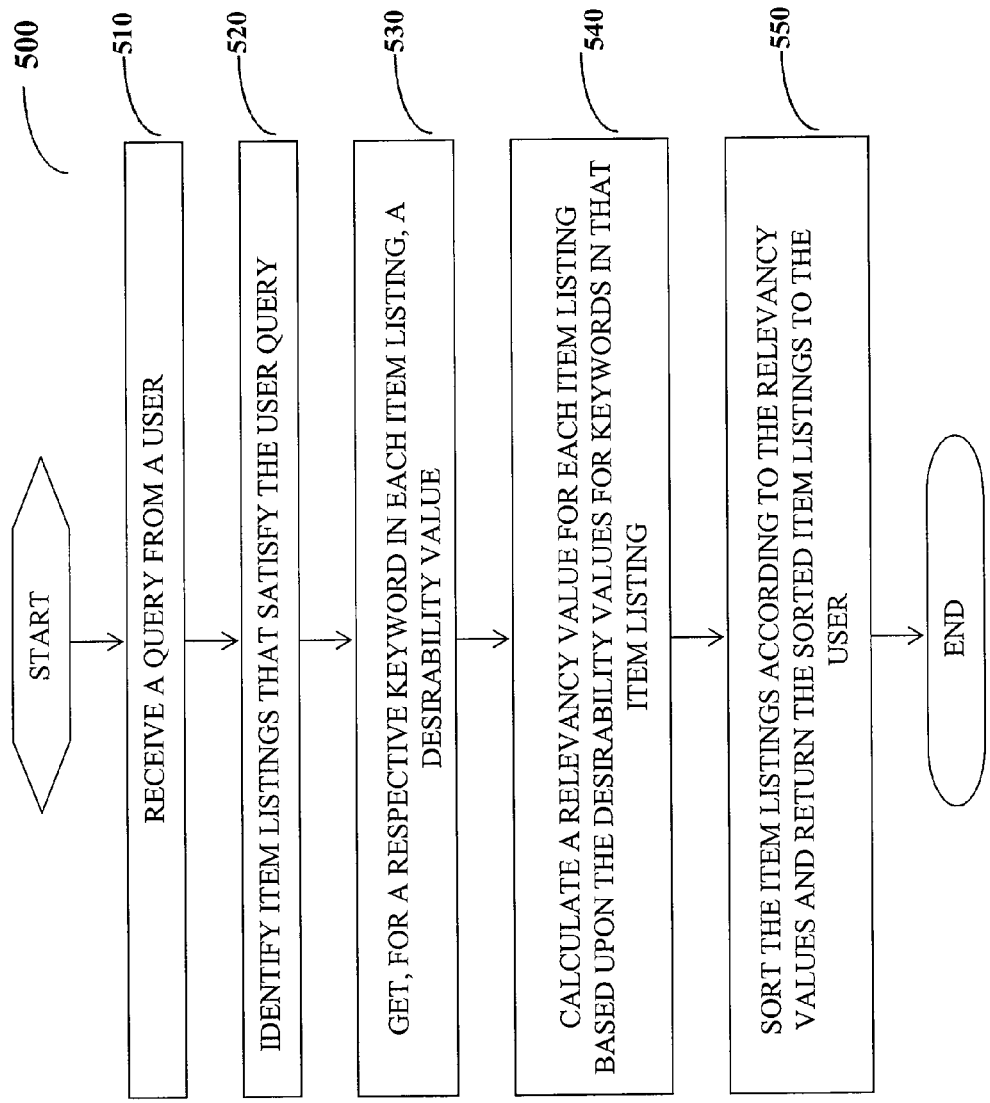
FIG. 5 is a flow chart illustrating a method to sort item listings in a search result using a desirability index in accordance with an example embodiment.

FIG. 5 is a flow chart illustrating a method to sort item listings in a search result using a desirability index 500 according to an example embodiment. In some example embodiments, the method 500 may be implemented by the host device 120. At operation 510, a query (e.g., 320) may be received from a user via the item listing request engine of a corresponding user device (e.g., 110-1). The query may include one or more keywords. At operation 520, a search result (e.g., 340) including item listings (e.g., 342, 344 and 346) that satisfy the query (e.g., 320) may be identified. In some example embodiments, a remotely or locally connected database may be searched to find the satisfying item listings. At operation 530, for a respective item listing in the search result (e.g. 340), a desirability value may be obtained for each term in the respective item listing from the desirability index (e.g., 129). At operation 540, a relevancy value may be calculated for the respective item listing as a function of one or more of the desirability values for the terms in the title of the respective item listing. In some example embodiments, a mathematical function may be used for that purpose. For example, if a matching term is found in the desirability index, the desirability value associated with the term may be cumulatively added until the desirability values for all of the terms are added together. At operation 550, if the relevancy values for two or more of the identified item listings are calculated, the item listings may then be sorted according to their relevancy values. The sorted search result (e.g., 360) may then be returned to the user via the item listing request engine (e.g., 112) of the user device (e.g., 110-1).

In some example embodiments, the desirability values for the terms that are included in the query may not be added to calculate the relevancy value for a corresponding item listing. In some example embodiments, a predefined temporal range (e.g., an hour, a day, a week, etc.) or a user defined temporal range (e.g., Jan. 1, 2008-Jan. 31, 2008, etc.) may be placed in calculating the relevancy value. This may allow reducing changes in the desirability index 129 that need to be considered to obtain the relevancy value. This may also allow a more correct usage of recent changes in the desirability index reflecting users' recent activities. For example, if the temporal range is set to be a week, then the desirability values assigned based upon user activities that occurred earlier than a week may not be considered in calculating the relevancy value. In some example embodiments, the temporal value may be received from the user device (e.g., 110-1) via the item listing request engine (e.g., 112).

As explained above in FIGS. 1-5, the item listings (e.g., 342, 344, and 346) in the search result (e.g., 340) may be sorted according to the relevancy value which may be calculated based upon one or more of the sale format (e.g., an auction versus a fixed price sale), the listing period (e.g., ending time) and the number of bids of a corresponding item listing. It is, therefore, possible to account for users' proxy (e.g., activities such as clicking-through) on the item listings (e.g., 352, 354, and 356) in the search result 350 in a more enhanced way than when such sale format related factors are not considered. For example, it is possible to account for the fact that a clicked-on item listing is not a fixed price sale but an auction sale, for the fact that the item listing is ending soon, and/or for the fact that the number of bids on the item listing is large. As explained above, some item listings are clicked on by users not because of the relevancy of the terms in the title of the item listing but because of the fact that these item listings are in an auction format, ending soon and/or having a large bid number, etc. By incorporating the sale format related factors in building a desirability index, it is possible to prevent or reduce the possibility that desirability values for terms in the item listings will become skewed. As a result, a more accurate relevancy value for an item listing may be calculated and thereby a more enhanced sorting result may be returned to the users. This, in turn, results in the users shopping (e.g., checking) through more relevant item listings than only the first on the top of the search result.

Example Database

Some example embodiments may include the various databases (e.g., the item listing database 130) being relational databases or in some example cases On Line Analytic Processing (OLAP)-based databases. In the case of relational databases, various tables (e.g., item listing table 600) of data are created and data is inserted into, and/or selected from, these tables using SQL or some other database-query language known in the art. In the case of OLAP databases, one or more multi-dimensional cubes or hypercubes containing multidimensional data from which data is selected or into which data is inserted using Multidimensional Expressions (MDX) may be implemented. In the case of a database using tables and SQL, a database application such as, for example, MYSQL™, SQLSERVER™, Oracle 81™, 10G™, or some other suitable database application may be used to manage the data. Here, the case of a database using cubes and MDX, a database using Multidimensional On Line Analytic Processing (MOLAP), Relational On Line Analytic Processing (ROLAP), Hybrid On Line Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

FIG. 6 is a diagram illustrating a data structure for an item listing table 600 according to an example embodiment. In some example embodiments, this data structure may be used to track user activities on item listings and assign numerical values accordingly as explained above in FIGS. 1-5. Illustrated properties in FIG. 6 are item listing identification (ID) 610, view tag 620, keywords in title 630, sale format 640, listing period 650 and number of bids 660. The item listing ID 610 may be a unique numerical number assigned to each item listing. The item listing ID 610 may be, therefore, used to identify an item listing from a plurality of item listings with the same keywords. The view tag 620 may be a word, symbol or number that indicates whether an item listing associated with the view tag has been clicked by a user. In some example embodiments, the history of the user's activities on item listings in a search result may be tracked. The keyword in title 630 shows a list of one or more keywords in a title of an item listing. In some example embodiments, the keyword in title 630 may be divided into two categories: query keyword 632 and non-query keyword 634. In such an example embodiment, the query keyword 632 may show one or more keywords (or terms) in the title that were included in the query submitted by the user. The non-query keyword 634 may show one or more keywords (or terms) in the title that were not included in the query.

The sale format 640 may be a word, string or numerical value that indicates the format of sale of an item listing. For example, the sale format may be an auction sale, a fixed price sale or a combination thereof (e.g., an auction sale with a minimum bidding price or buy now price). The listing period (e.g., ending time) 650 may be a continuous or non-continuous numerical value that indicates a remaining time for an item listing associated with the listing period 650 to be displayed to the user device (e.g., 110-1) via the item listing requesting engine (e.g., 112). If a non-continuous numerical value is used, the listing period 650 may be assigned one of a plurality of predefined values (e.g., seven days, six days, five days, four days, three days, two days, one day, one hour, 30 minutes, 5 minutes, etc.). The number of bids 660 may be a number that indicates how many bids have been made on a corresponding item listing. In some example embodiments, other values may be used to represent different sale formats. For example, an auction sale with a minimum bidding price may be treated as a separate sale format from an auction sale without any minimum bidding price. Likewise, a fixed price sale with a limited listing period may be treated as a separate sale format from an ordinary fixed price sale without any listing period.

FIG. 7 is a diagram illustrating a data structure for a desirability index table 700 according to an example embodiment. In some example embodiments, this data structure may be built in the item listing database 130 which may be locally or remotely coupled to the host device 120. Illustrated in FIG. 7 are identification (ID) 710, keyword 720, desirability value 730 and reserved area 760. The ID 710 may be a numerical value that uniquely identifies a tuple (e.g., row) in the desirability index table 700. The keyword 720 may be a word that represents a term associated with a corresponding tuple. In some example embodiments, the keyword 720 may be a string that represents two or more terms. The desirability value 730 may be a numerical value that represents the number of user's activities (e.g., viewing, bidding, buying, etc.) made on one or more item listings that include a corresponding keyword 720 throughout a period of time. In some example embodiments, the desirability value 730 may be positive, negative or even zero (not shown in FIG. 7).

In some example embodiments, the desirability index table 700 may further include demand value 740 and supply value 750. The demand value 740 may be a numerical (e.g., integer or percentage) value that represents a percentage of times a corresponding keyword is referenced in a plurality of search queries. The supply value 750 may be a numerical (e.g., integer or percentage) value that represents a percentage of times user activity is associated with the first keyword relative to a plurality of user activities. The desirability value for a corresponding keyword may be determined based upon the difference between the demand value 740 and the supply value 750. More detailed explanation about the demand value 740 and the supply value 750 is described in the U.S. patent application Ser. No. 11/679,973. Finally, the reserved area 760 may be included in the desirability index table 700 for a future use.

It is noted that although FIGS. 1-7 and corresponding descriptions above illustrate a situation where an auction sale item is favored, in another example embodiment, the system and method described in this document may favor a fixed sale item or a mixed sale format item over an auction sale item. For example, an experience of an online listing system such as eBay shows that a certain number of users select sport (e.g., golf) equipment items because the items are listed as fixed price sale at appealing prices rather than because the items are relevant to what they have sought. In such a case, the tracking engine 127 may assign a positive numerical value to keywords or phrases included in an item listing posted as a fixed sale format if the item listing is selected by a user. In contrast, the tracking engine 127 may assign zero or a negative numerical value to keywords or phrases included in an item listing posted as a (pure) auction item (i.e., without any "buy-it-now price") upon the item being selected by a user. This way, the host device 120 may build a desirability index that favors keywords included in fixed sale item listings over keywords included in auction item listings. If the desirability index is built based upon the policy favoring a fixed sale format, the host device 120 may then calculate a relevancy value for a respective item listing in a search result that matches a user query using the desirability index in the same or similar way as described above with reference to FIGS. 1-7. The search engine 125 may then sort the item listings according to their corresponding relevancy values and return the sorted item listings to the user as a final search result.

It is also noted that those skilled in the art will understand that an alternative preference of one sale format over another may be readily applicable to the system and method described in this document, for example, according to users' transaction history. It is also noted that the system and method may designate an order of preference according to a category of item listings identified by a user query. For example, while an auction sale may be favored, a fixed sale format may be favored for sport (e.g., golf) equipments. In such a case, the system and method may dynamically alternate its favored sale format from an auction sale format to a fixed sale format or vice versa according to the category of items listings identified by the user query.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free from application processing. Further, a second tier may be a logic tier that performs application processing in the form of logical/mathematical manipulations of data inputted through the interface level, and that communicates the results of these logical/mathematical manipulations to the interface tier and/or to a backend or storage tier. These logical/mathematical manipulations may relate to certain business rules or processes that govern the software application as a whole. A third storage tier may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer-to-peer, or some other suitable configuration. Further, these three tiers may be distributed between more than one computer system as various software components.

Component Design

Some example embodiments may include the above illustrated tiers and the processes or operations that make them up, as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), JavaBeans (JB), Enterprise JavaBeans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls used to implement one or more of the above-illustrated components across a distributed programming environment as distributed computing components. For example, an interface component (e.g., an interface tier) may reside on a first computer system remotely located from a second computer system containing a logic component (e.g., a logic tier). These first and second computer systems may be configured in a server-client, peer-to-peer, or some other suitable configuration. These various components may be written using the above-illustrated object-oriented programming techniques, and can be written in the same programming language or a different programming language. Various protocols may be implemented to enable these various components to communicate regardless of the programming language used to write these components. For example, a component written in C++ may be able to communicate with another component written in the Java programming language using a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission between a Server and Client

Some example embodiments may use the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as the Internet, a Local Area Network (LAN), a Wide Area Network (WAN), or some other suitable network. In some example cases, "Internet" refers to a network of networks. These networks may use a variety of protocols for the exchange of data, including the aforementioned TCP/IP, and additionally Asynchronous Transfer Mode (ATM), Systems Network Architecture (SNA), or some other suitable protocol. These networks may be organized within a variety of topologies (e.g., a star topology) or structures.

A Computer System

Figure 8:
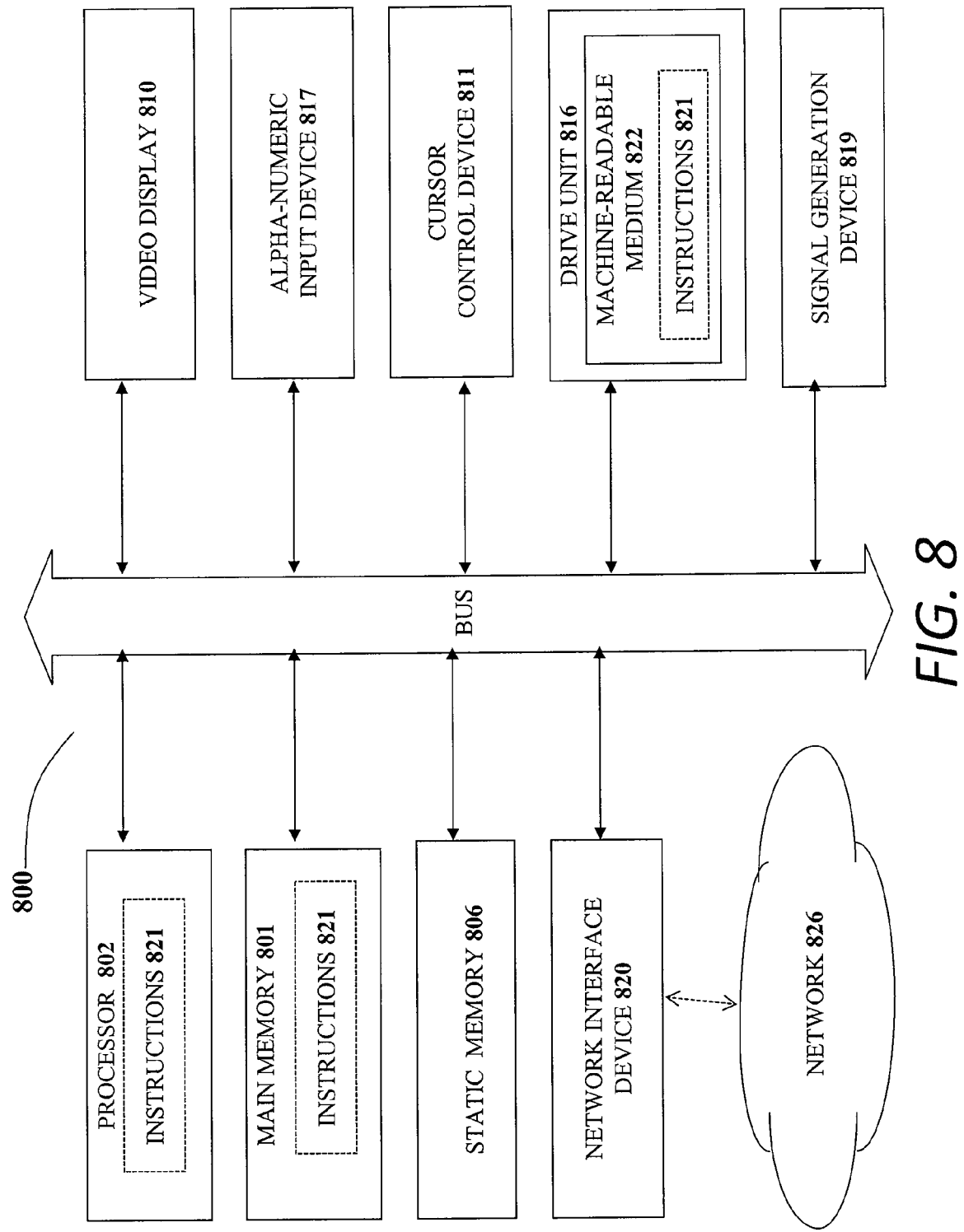
FIG. 8 shows a diagrammatic representation of a machine in the example form of a computer system in accordance with an example embodiment.

FIG. 8 is a diagram showing an example computer system 800 that executes a set of instructions to perform any one or more of the methodologies discussed herein. In some example embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The computer system 800 includes a processor 802 (e.g., a Central Processing Unit (CPU), a Graphics Processing Unit (GPU) or both), a main memory 801, and a static memory 806, which communicate with each other via a bus 808. The computer system 800 may further include a video display 810 (e.g., a Liquid Crystal Display (LCD) or a Cathode Ray Tube (CRT)). The computer system 800 also includes an alphanumeric input device 817 (e.g., a keyboard), a User Interface (UI) cursor controller device 811 (e.g., a mouse), a drive unit 816, a signal generation device 819 (e.g., a speaker) and a network interface device (e.g., a transmitter) 820.

The drive unit 816 includes a machine-readable medium 822 on which is stored one or more sets of instructions and data structures (e.g., software) embodying or used by any one or more of the methodologies or functions illustrated herein. The software may also reside, completely or at least partially, within the main memory 801 and/or within the processor 802 during execution thereof by the computer system 800, the main memory 801 and the processor 802 also constituting machine-readable medium 822.

The instructions 821 may be further transmitted or received over a network 826 via the network interface device 820 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories and optical and magnetic mediums.

Marketplace Applications

In some example embodiments, a system and method are illustrated to build a desirability index using sale format related information. The system and method include providing a user device with a first search result including one or more item listings in response to a first query received from the user device. Each item listing may include a plurality of keywords and be associated with a sale format. The system and method include tracking a plurality of transactions performed on the item listings via the user device. The system and method include assigning, for each transaction, a first numerical value to the keywords included in a selected item listing and a second numerical value to the keywords included in non-selected item listings. The first numerical value may be determined based upon the sale format associated with the selected item listing. The system and method further include building a desirability index using the numerical values assigned to the keywords. The desirability index may include a desirability value for each of the keywords. The desirability value may indicate an accumulative frequency of a corresponding keyword being selected throughout the transactions. The desirability index may be accessed later to sort item listings in a second search result identified in response to a second query.

In some example embodiments, the system and method may accumulate the desirability values for corresponding keywords in a respective item listing in the second search result to calculate a relevancy value for the respective item listing. The system and method may further sort the item listings in the second search result based upon their relevancy values and return the sorted second search result to the user device.

Additional Notes

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code may be tangibly stored on one or more volatile or non-volatile computer-readable media such as during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above "DETAILED DESCRIPTION" includes references to the accompanying drawings, which form a part of the "DETAILED DESCRIPTION." The drawings show, by way of illustration, specific example embodiments of the invention that can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Example Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Example Embodiments, with each claim standing on its own as a separate embodiment.

What is claimed is:

1. A method comprising:
providing a user device with a first search result including one or more item listings in response to a first query received from the user device, each item listing including a plurality of keywords and being associated with a sale format;
tracking a plurality of transactions performed on the one or more item listings via the user device;
assigning, using one or more processors, for each transaction, a first numerical value to one or more keywords included in a selected item listing and a second numerical value to one or more keywords included in non-selected item listings, the first numerical value being determined based upon the sale format associated with the selected item listing, the assigning including determining the first numerical value based at least in part on whether the sale format associated with the selected item listing is a fixed price sale or a non-fixed price sale; and
building a desirability index using one or more numerical values including the first and second numerical values, the desirability index including a desirability value for each keyword, the desirability value being determined based on one or more first numerical values assigned to the keyword, and the desirability value indicating an accumulative frequency of a corresponding keyword being selected throughout the plurality of transactions; wherein the desirability index is accessed to sort item listings in a second search result identified in response to a second query.

2. The method of claim 1, wherein the first numerical value is a positive value upon determination of the sale format being an auction sale.

3. The method of claim 1, wherein the first numerical value is zero or a negative value upon determination of the sale format being the fixed price sale.

4. The method of claim 1, wherein each item listing is further associated with a remaining listing period and wherein the first numerical value is determined based upon the remaining listing period associated with the selected item listing.

5. The method of claim 4, wherein the first numerical value is a positive value upon determination of the remaining listing period being equal to or shorter than a specified period.

6. The method of claim 4, wherein the first numerical value is zero or a negative value upon determination of the remaining listing period being longer than a specified period.

7. The method of claim 1, wherein each item listing is further associated with a number of bids and wherein the first numerical value is determined based upon the number of bids associated with the selected item listing.

8. The method of claim 7, wherein the first numerical value is a positive value upon determination of the number of bids being equal to or larger than a specified number.

9. The method of claim 7, wherein the first numerical value is zero or a negative value upon determination of the number of bids being less than a specified number.

10. The method of claim 1, wherein the first numerical value is not assigned to a keyword upon determination of the keyword being included in the first query.

11. The method of claim 1, wherein the first numerical value is zero or a negative value upon determination of the sale format being an auction sale.

12. The method of claim 1, wherein the first numerical value is a positive value upon determination of the sale format being the fixed price sale.

13. The method of claim 1, wherein the non-fixed price sale comprises an auction.

14. The method of claim 1, wherein the determining of the first numerical value for assigning comprising assigning a first value as the first numerical value based at least in part on determining that the sale format associated with the selected item listing is the fixed price sale, and assigning a second value different from the first value as the first numerical value based at least in part on determining that the sale format is the non-fixed price sale.

15. The method of claim 1, wherein the desirability value is determined differently based at least in part on whether the sale format is the non-fixed price sale or the fixed price sale.

16. A method comprising:
providing, using one or more processors, a desirability index including a plurality of desirability values, the desirability index being built such that each desirability value is associated with a keyword, is determined according to a numerical value assigned to a selected item listing having the keyword based upon a sale format associated with the selected item listing, and indicates an accumulative frequency of the keyword being included in a first set of one or more item listings selected throughout a number of user transactions, the assigning of the numerical value comprising determining the numerical value based at least in part on whether the sale format associated with the selected item listing is a fixed price sale or a non-fixed price sale;

identifying, using the one or more processors, a search result including a second set of one or more item listings in response to a query from a user device, each item listing including a plurality of keywords;

accessing, using the one or more processors, for each item listing, the desirability index and obtaining a desirability value for each keyword included in the item listing;

calculating, using the one or more processors, a relevancy value for each item listing, the relevancy value being an accumulation of the desirability values for the keywords included in the item listing; and sorting, using the one or more processors, the item listings in the search result according to the relevancy values for the item listings and returning the sorted item listings to the user device.

17. The method of claim 16, wherein the desirability values for the keywords are not accumulated to calculate the relevancy value upon determination of the keywords being included in the query.

18. The method of claim 16, wherein the desirability values for the keywords are not accumulated to calculate the relevancy value upon determination of the desirability values being modified prior to a specified temporal range.

19. The method of claim 16, wherein the specified temporal range is received from the user device.

20. An apparatus comprising:

at least one hardware processor to run a search engine, the search engine configured to provide a user device with a first search result including one or more item listings in response to a first query received from the user device, each item listing including a plurality of keywords and being associated with a sale format; and a tracking engine, executed by the at least one hardware processor, to track a plurality of transactions performed on the item listings via the user device, and to assign, for each transaction, a first numerical value to one or more keywords included in a selected item listing and a second numerical value to one or more keywords included in non-selected item listings, the first numerical value being determined based upon the sale format associated with the selected item listing, the assigning comprising determining the first numerical value based at least in part on whether the sale format associated with the selected item listing is a fixed price sale or a non-fixed price sale, the tracking engine configured to build a desirability index using one or more numerical values including the first and second numerical values, the desirability index including a desirability value for each keyword, the desirability value being determined based on one or more first numerical values assigned to the keyword, and the desirability value indicating an accumulative frequency of a corresponding keyword being selected throughout the plurality of transactions;

wherein the desirability index is accessed to sort item listings in a second search result identified in response to a second query.

21. The apparatus of claim 20, wherein the first numerical value is a positive value upon determination of the sale format being an auction sale.

22. The apparatus of claim 20, wherein the first numerical value is zero or a negative value upon determination of the sale format being the fixed price sale.

23. The apparatus of claim 20, wherein each item listing is further associated with a remaining listing period and wherein the tracking engine determines the first numerical value based upon the remaining listing period associated with the selected item listing.

24. The apparatus of claim 20, wherein each item listing is further associated with a number of bids and wherein the tracking engine determines the first numerical value based upon the number of bids associated with the selected item listing.

25. The apparatus of claim 20, wherein the first numerical value is zero or a negative value upon determination of the sale format being an auction sale.

26. The apparatus of claim 20, wherein the first numerical value is a positive value upon determination of the sale format being the fixed price sale.

27. An apparatus comprising:

a desirability index including a plurality of desirability values, each desirability value being associated with a keyword, being determined according to a numerical value assigned to a selected item listing having the keyword based upon a sale format associated with the selected item listing, and indicating an accumulative frequency of the keyword being included in a first set of one or more item listings selected throughout a number of user transactions, the assigning of the numerical value comprising determining the numerical value based at least in part on whether the sale format associated with the selected item listing is a fixed price sale or a non-fixed price sale;

at least one hardware processor to run a search engine, the search engine configured to identify a search result including a second set of one or more item listings in response to a query from a user device, each item listing including a plurality of keywords; and a lookup engine, executed by the at least one hardware processor, to access, for each item listing, the desirability index and obtain a desirability value for each keyword included in the item listing and to calculate a relevancy value for each item listing, the relevancy value being an accumulation of the desirability values for the keywords included in the item listing;

wherein the search engine is configured to sort the item listings in the search result according to the relevancy values for the item listings and return the sorted item listings to the user device.

28. The apparatus of claim 27, wherein the lookup engine does not accumulate the desirability values for the keywords to calculate the relevancy value upon determination of the desirability values being modified prior to a specified temporal range.

29. The apparatus of claim 27, wherein the lookup engine receives a specified temporal range from the user device.

30. A non-transitory computer-readable medium having instructions stored thereon that, when executed by one or more processors cause the one or more processors to perform operations comprising:

providing a user device with a first search result including one or more item listings in response to a first query received from the user device, each item listing including a plurality of keywords and being associated with a sale format;

tracking a plurality of transactions performed on the one or more item listings via the user device;

assigning, for each transaction, a first numerical value to one or more keywords included in a selected item listing and a second numerical value to one or more keywords included in non-selected item listings, the first numerical value being determined based upon the sale format associated with the selected item listing, the assigning including determining the first numerical value based at least in part on whether the sale format associated with the selected item listing is a fixed price sale or a non-fixed price sale; and building a desirability index using one or more numerical values including the first and second numerical values, the desirability index including a desirability value for each of the keyword, the desirability value being determined based on one or more first numerical values assigned to the keyword, and the desirability value indicating an accumulative frequency of a corresponding keyword being selected throughout the plurality of transactions;

wherein the desirability index is accessed to sort item listings in a second search result identified in response to a second query.

31. A non-transitory computer-readable medium having instructions stored thereon that, when executed by one or more processors cause the one or more processors to perform operations comprising:

providing a desirability index including a plurality of desirability values, the desirability index being built such that each desirability value is associated with a keyword, is determined according to a numerical value assigned to a selected item listing having the keyword based upon a sale format associated with the selected item listing, and indicates an accumulative frequency of the keyword being included in a first set of one or more item listings selected throughout a number of user transactions, the assigning of the numerical value comprising determining the numerical value based at least in part on whether the sale format associated with the selected item listing is a fixed price sale or a non-fixed price sale;

identifying a search result including a second set of one or more item listings in response to a query from a user device, each item listing including a plurality of keywords;

accessing, for each item listing, the desirability index and obtaining a desirability value for each keyword included in the item listing;

calculating a relevancy value for each item listing, the relevancy value being an accumulation of the desirability values for the keywords included in the item listing; and sorting the item listings in the search result according to the relevancy values for the item listings and returning the sorted item listings to the user device.

* * * * *